Figure 1:
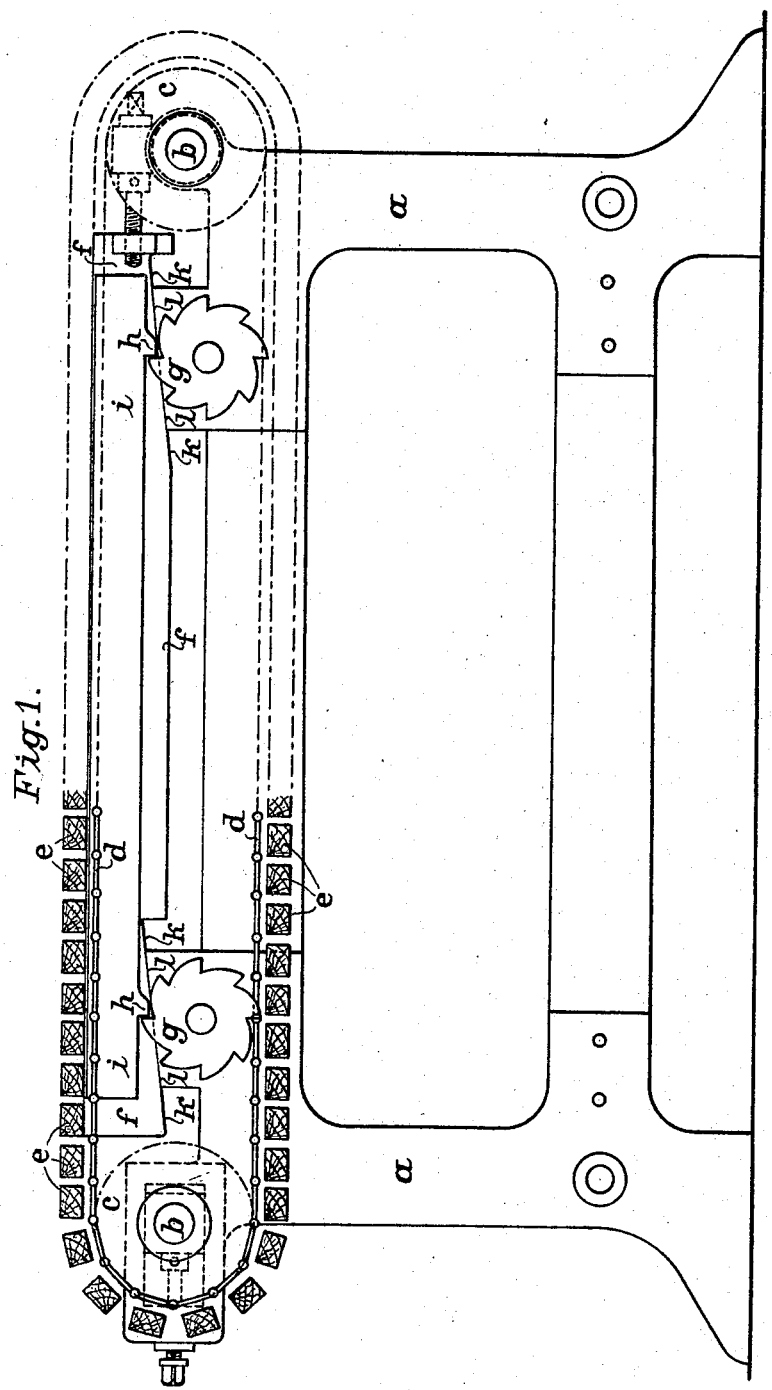

P. HANEL.
BEATING APPARATUS FOR MOLDING TABLETS OF CHOCOLATE OR THE LIKE.
APPLICATION FILED NOV. 27, 1912.

1,187,143.

Patented June 13, 1916.
2 SHEETS—SHEET 1.

Witnesses
Chas. F. Clagett
Bertha M. Allen.

Inventor,
Paul Hänel
By Ferrell & Son
his Attorneys.

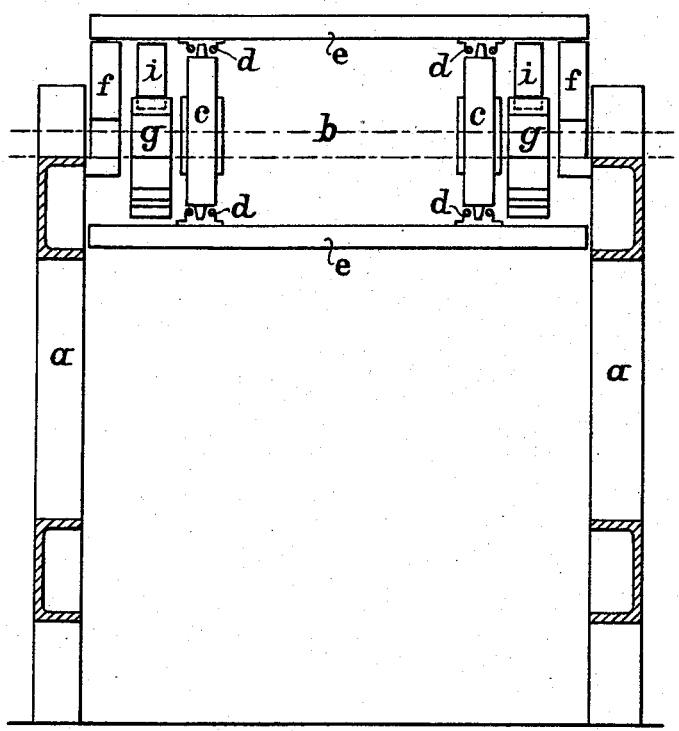

UNITED STATES PATENT OFFICE.

PAUL HÄNEL, OF DRESDEN, GERMANY, ASSIGNOR TO LOUIS BERNHARD LEHMANN, OF DRESDEN, GERMANY.

BEATING APPARATUS FOR MOLDING TABLETS OF CHOCOLATE OR THE LIKE.

1,187,143.  Specification of Letters Patent.  Patented June 13, 1916.

Application filed November 27, 1912. Serial No. 733,749.

*To all whom it may concern:*

Be it known that I, PAUL HÄNEL, a subject of the King of Saxony, German Emperor, and resident of Dresden, Hohestrasse 65, Kingdom of Saxony, German Empire, have invented a new and useful Beating Apparatus for Molding Tablets of Chocolate or the like, of which the following is a specification.

Beating apparatus for molding tablets of chocolate and provided with a table or plate vertically and alternately moving up and down within small or short intervals and freely falling down onto a resistant part are known. In working or operating said beating-apparatus, especially on a large scale, it has been advantageous to cause, besides the beating-action, an automatic traveling movement of the molds. It was tried to produce said supplemental traveling movement by causing the table or plate moving up and down to move at an angle to the vertical plan or by so-called oblique impacts for the purpose of obtaining a forward sliding of the molds on the table or plate.

Another mode to produce the supplemental traveling mentioned of the molds consisted in placing an endless band or apron of leather or linen on the plate or table.

The first mentioned kind of movement in an oblique direction to the vertical plan has the drawback that the traveling movement of the molds is an unreliable one, for the reason that the molds are sometimes moved slowly and sometimes rapidly; besides the drawback stated above, it is impossible to influence the traveling movement of the molds independently of the beating action.

The kind of movement mentioned at the second place however is objectionable to the beating-action by the formation of a yielding layer situated between the molds and the plate or table and caused by the endless band or apron of leather or linen. Furthermore it may happen that this band or apron does not lie snugly on the table or plate whereby a more or less intensive air-cushion is formed hindering at a higher degree the beating-action.

Now the present invention has for its object to obviate the drawbacks mentioned above, and its main feature is seen in the fact that it combines the advantage of the table or plate vertically moving in an upward direction and freely falling down with the advantage of the positive traveling movement, without the use of traveling bands or aprons of leather or linen arranged between the molds and the plate or table. To insure the combination of these two advantages mentioned before, the plate or table moving in an upward direction and freely falling down is formed of separate or independent battens or bars and said battens or bars are fastened to the links of positively actuated or moved endless chains to produce a traveling movement of the molds. In this manner an absolutely positive traveling movement of the molds fully independent of the beating-action is obtained.

In the drawing Figure 1 represents a beating-apparatus according to the present invention in longitudinal elevation. Fig. 2 is a front elevation of the apparatus partly in section.

In the form shown in these figures the standards are denoted by $a$, the shaft carried by them by $b$ and the two chain-wheels fastened to said shaft by $c$. Each pair of these chain-wheels is provided with an endless chain $d$ and these two chains are actuated together in a suitable manner.

The battens or bars of wood or another suitable material and forming the beating-table are denoted by $e$. These battens or bars $e$ are fastened to the links of the chains $d$ which may be stretched in a well known manner. The battens or bars situated at the time being in the upper part of the chains rest on adjustable carriers, denoted by $f$. Two supports $i$ provided with projections or noses $h$ are arranged between the carriers $f$. The shafts of cam-wheels $g$ arranged below the supports $i$ are connected together by an endless chain to jointly drive said cam-wheels.

The table or plate formed by the battens or bars $e$ acts by the intermediate of the chain-wheels $c$ as a supplying band or apron of the filled molds placed on the latter. During the traveling movement of these molds the rotating cam-wheels $g$ meet the noses or projections $h$ of the supports $i$ in such a manner that these supports and by them the battens or bars $e$ situated for the time being in the upper part of the chain are vertically raised to at once freely fall down again onto the supports mentioned.

The weight of the chains $d$ itself favorably acts for the falling down of the battens or bars $e$ and this falling down movement will be a more or less rapid one and therefore the blow caused will be a more or less intensive one according to whether the chains are more or less stretched. The speed with which the molds travel by the intermediate of the table is fully independent of the intensity of the blow as well of the blowing-action at all.

The carriers $f$ supporting the battens or bars $e$ situated for the time being in the upper part of the chain rest on stationary slanting supporting surfaces $l$ by means of the slanting surfaces $k$ in such a manner that the position in height or level of the battens or bars $e$ supported by the carriers $f$ is varied by displacing the latter, whereby the length of stroke of the battens or bars mentioned is fixed and may be brought, if desired, to *nil*.

What I claim is:

1. In an apparatus of the class described, a frame, endless chains, cross bars extending between, at right angles to, and connected to the links of said chains, carriers upon which the ends of the said cross bars rest and slide, supports for the opposite ends of the said carriers, means for adjusting the position of the said supports to determine the height of the said carriers, agitator bars running parallel to the chains and beneath the cross bars, and means for intermittently raising the said agitator bars horizontally and permitting the same to drop suddenly to simultaneously raise the said cross bars and permit them to drop freely.

2. In an apparatus of the class described, a frame, endless chains, cross bars extending at right angles between and connected to the links of said chains, carriers upon which the ends of the cross bars normally rest and slide, supports for the opposite ends of the said carriers, brackets adjustable to position for determining the height of the said supports, agitator bars running parallel to the chains and beneath the cross bars, and means for intermittently raising the said agitator bars horizontally and permitting the same to drop suddenly to simultaneously raise the said cross bars and permitting them to drop freely on to the said carriers.

3. In an apparatus of the class described, a frame, endless chains, cross bars extending at right angles between and connected to the links of said chains, carriers upon which the ends of the cross bars normally rest and slide, supports for the opposite ends of the said carriers, brackets adjustable to position for determining the height of the said supports, agitator bars running parallel to the chains and beneath the cross bars, projections depending from both ends of said agitator bars, and cam wheels engaging the said depending projections on the agitator bars.

4. In an apparatus of the class described, a frame, endless conveyers, cross bars extending between at right angles to and connected adjacent their ends to corresponding parts of said conveyers, carriers upon which the end portions of said cross bars rest and slide, adjustable supports for the opposite ends of said carriers to determine the height of the same relatively to the said cross bars, agitator bars running parallel to said conveyers and beneath said cross bars, and means for intermittently raising said agitator bars horizontally and permitting the same to drop suddenly to simultaneously raise said cross bars and permit them to drop freely.

In testimony that I claim the foregoing as my invention I have signed my name in presence of two witnesses, this 5th day of November, 1912.

PAUL HÄNEL.

Witnesses:
WILHELM E. SCHWANTSUF,
PAUL ARRAS.